(12) United States Patent
Mutlu

(10) Patent No.: US 12,491,840 B2
(45) Date of Patent: Dec. 9, 2025

(54) METHOD AND MOTOR VEHICLE

(71) Applicant: MERCEDES-BENZ GROUP AG, Stuttgart (DE)

(72) Inventor: Özgür Mutlu, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 92 days.

(21) Appl. No.: 18/287,667

(22) PCT Filed: Feb. 11, 2022

(86) PCT No.: PCT/EP2022/053311
§ 371 (c)(1),
(2) Date: Oct. 20, 2023

(87) PCT Pub. No.: WO2022/223166
PCT Pub. Date: Oct. 27, 2022

(65) Prior Publication Data
US 2024/0359658 A1    Oct. 31, 2024

(30) Foreign Application Priority Data

Apr. 23, 2021    (DE) ...................... 10 2021 002 165.7

(51) Int. Cl.
*B60R 25/31*        (2013.01)
*B60R 25/24*        (2013.01)
(Continued)

(52) U.S. Cl.
CPC .............. *B60R 25/31* (2013.01); *B60R 25/24* (2013.01); *B60R 25/305* (2013.01); *G07C 9/00309* (2013.01); *G07C 2209/64* (2013.01)

(58) Field of Classification Search
CPC ....... B60R 25/31; B60R 25/24; B60R 25/305; G07C 9/00309; G07C 2209/64
See application file for complete search history.

(56) References Cited

U.S. PATENT DOCUMENTS 8,935,052 B2    1/2015  Hermann
10,417,905 B2 *  9/2019  Altinger ........... G08G 1/096733
(Continued)

FOREIGN PATENT DOCUMENTS

DE      102010010057 A1    9/2011
DE      102013220240 A1    4/2015
(Continued)

OTHER PUBLICATIONS

International Search Report and Written Opinion mailed May 24, 2022 in related/corresponding International Application No. PCT/EP2022/053311.
(Continued)

*Primary Examiner* — Thomas D Alunkal
(74) *Attorney, Agent, or Firm* — PATENT PORTFOLIO BUILDERS PLLC

(57) ABSTRACT

A method involves monitoring an outer zone, which adjoins an inner zone directly surrounding the motor vehicle, by a monitoring device of the motor vehicle, such that a current position of the user relative to the motor vehicle is determined by the monitoring device if the monitoring shows the user is in the outer zone. A close proximity monitoring device of the motor vehicle scanning the inner zone is activated if the monitoring shows the user is crossing from the outer zone into the inner zone, such that the current position of the user relative to the motor vehicle is only determined by the close proximity monitoring device if the user is located in the inner zone. At least one of the points of access to the vehicle interior of the motor vehicle is released for the user after the monitoring has shown that they are in the inner zone.

13 Claims, 1 Drawing Sheet

Figure 1:
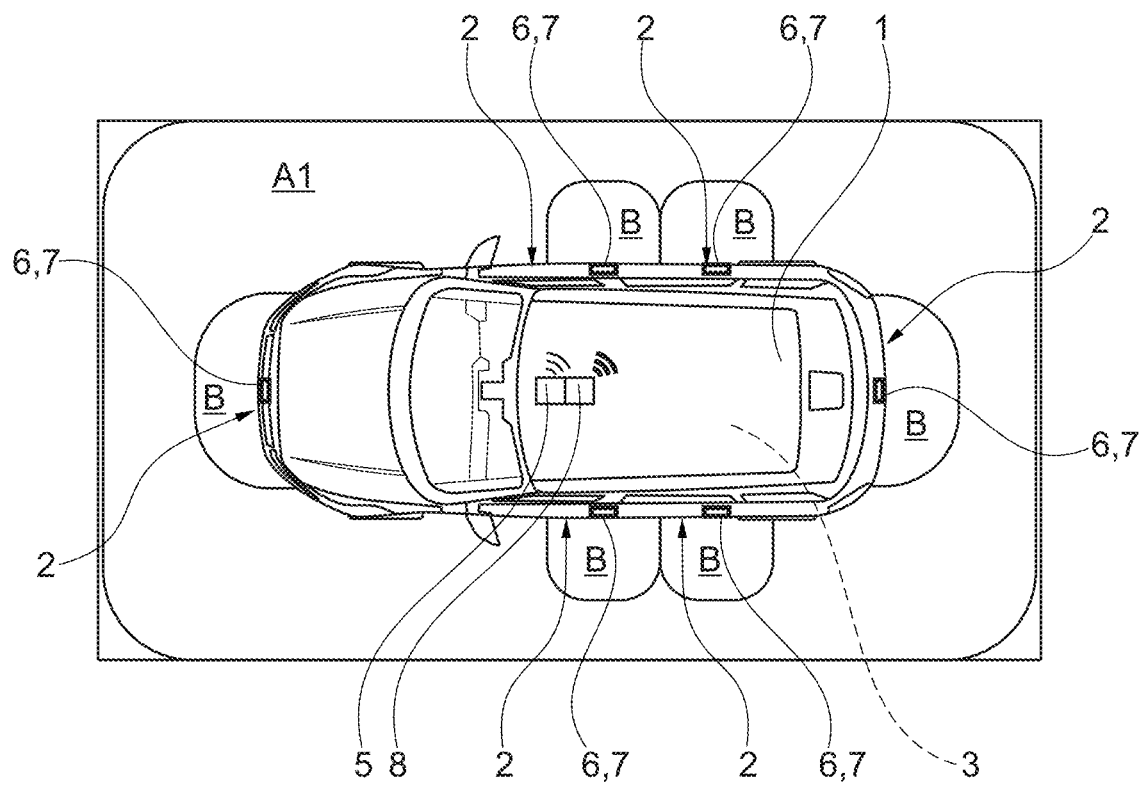

(51) Int. Cl.
  *B60R 25/30* (2013.01)
  *G07C 9/00* (2020.01)

(56) References Cited

U.S. PATENT DOCUMENTS

| | | | |
|---|---|---|---|
| 10,487,546 | B2 | 11/2019 | Egawa et al. |
| 10,803,687 | B1 * | 10/2020 | Khamis .............. G07C 9/00309 |
| 10,906,508 | B2 | 2/2021 | Neuhoff et al. |
| 11,548,517 | B2 * | 1/2023 | Golsch .................. H04W 76/10 |
| 2015/0291126 | A1 | 10/2015 | Nicholls et al. |
| 2016/0107642 | A1 * | 4/2016 | Salgado ................ B60W 50/14 |
| | | | 701/1 |
| 2017/0247016 | A1 | 8/2017 | Krishnan |
| 2018/0339676 | A1 | 11/2018 | Lazarini et al. |
| 2019/0061686 | A1 * | 2/2019 | Neuhoff ................ H04W 4/023 |
| 2019/0304225 | A1 * | 10/2019 | Golsch .................. H04W 12/71 |
| 2020/0314651 | A1 * | 10/2020 | Pirch .................... G06F 12/1458 |
| 2021/0009080 | A1 | 1/2021 | Hu et al. |
| 2021/0179020 | A1 * | 6/2021 | Hasegawa .............. G07C 5/008 |
| 2022/0041133 | A1 * | 2/2022 | Rrumbullaku .......... H04W 4/02 |
| 2022/0292388 | A1 * | 9/2022 | Elangovan ......... G07C 9/00309 |

FOREIGN PATENT DOCUMENTS

| | | |
|---|---|---|
| DE | 102016008388 A1 | 2/2017 |
| DE | 102017103187 A1 | 8/2017 |
| DE | 112017000424 T5 | 11/2018 |
| DE | 102018005763 A1 | 1/2020 |

OTHER PUBLICATIONS

Office Action created Feb. 8, 2022 in related/corresponding DE Application No. 10 2021 002 165.7.

* cited by examiner

METHOD AND MOTOR VEHICLE

BACKGROUND AND SUMMARY OF THE INVENTION

Exemplary embodiments of the invention relate to a method for releasing at least one of several points of access to a vehicle interior of a motor vehicle for a user, as well as to a motor vehicle equipped for such a method.

For some time, methods for releasing at least one of several points of access to a vehicle interior of a motor vehicle for a user have been used, which do not require a key that interacts physically with a locking device of the motor vehicle.

For example, US 2020/0314651 A1 teaches a method according to which different ranges of a first communication signal based on the "Bluetooth Low Energy" standard and of a second communication signal based on the Ultra-Wide Band standard are used. The ranges of the first and of the second communication signal define a zone within which a determination of a spacing of an identification transmitter emitting the first and the second communication signal from one of several points of access of a motor vehicle that receives the first and the second communication signal is implemented. Using this spacing determination, the probability of the identification transmitter moving to each of the points of access of the motor vehicle is determined. Both are continuously transmitted between the identification transmitter and the motor vehicle.

DE 10 2016 008 388 A1 discloses evaluating a so-called RSSI level of a wireless communication signal emitted by an electronic vehicle key to determine a spacing between the electronic vehicle key and a motor vehicle that receives the communication signal.

Additionally, DE 10 2018 005 763 A1 discloses using a low-frequency part of a communication signal emitted by means of several Ultra-Wide Band antennae of a motor vehicle to determine the spacing of an identification transmitter from the individual antennae, and thus to determine a movement trajectory of the identification transmitter via so-called "low-frequency polling".

Such conventional methods come with disadvantages, however. It is thus frequently impossible to guarantee that the method will be carried out without interruption. Instead, the connection between an electrical identification transmitter and the motor vehicle is often interrupted, as a consequence of which irritating error messages can be passed on to a user carrying the identification transmitter with them. In addition, undesirable waiting times can also arise for the user if the communication connection between the identification transmitter and the motor vehicle is lost and has to be formed again.

Thus, exemplary embodiments of the invention resolve the disadvantages specified above using new approaches for methods for releasing at least one of several points of access to a vehicle interior of a motor vehicle for a user and also for motor vehicles that are equipped to carry out such a method.

Accordingly, the principle of the invention is to monitor several zones surrounding a motor vehicle in the manner of a shell with different monitoring devices of the motor vehicle, wherein each of the monitoring devices is based on a different operating principle or standard. A position of a user of the motor vehicle in the zones is monitored by means of the monitoring devices, wherein the position determination in a zone located on the outside in relation to the motor vehicle is used to activate the monitoring device for an inner zone adjoining the outer zone inwards in relation to the vehicle.

A fusion of sensor data or communication signals of the different monitoring devices of the motor vehicle can thus advantageously be obtained, which increases the precision and the speed of the determination of the user's position. In addition, when the user crosses from the outer zone into the inner zone, the position determination can be implemented without interruption, such that undesirable waiting times for the user when crossing from the outer zone into the inner zone can be avoided. The position of the user can thus be monitored without interruption.

A method according to the invention serves for releasing at least one of several points of access to a vehicle interior of a motor vehicle for a user. In this context, "releasing" can, in particular, be understood to mean unlocking or automatically opening a vehicle door blocking the point of access in question. According to the method, a first outer zone, which adjoins an inner zone directly surrounding the motor vehicle, is monitored by means of a first monitoring device of the motor vehicle, such that a current position of the user relative to the motor vehicle is determined by means of the first monitoring device if the monitoring shows that the user is located in the first outer zone. According to the method, a close proximity monitoring device of the motor vehicle scanning the inner zone is activated if the monitoring shows that the user is crossing from the first outer zone into the inner zone, such that the current position of the user relative to the motor vehicle is only determined by means of the close proximity monitoring device if the user is located in the inner zone. At least one of the points of access to the vehicle interior of the motor vehicle is released for the user after the monitoring has shown that they are located in the inner zone. As already previously explained, the method allows a particularly precise and quick determination of the user's position. The current position of the user relative to the motor vehicle can additionally be continuously monitored by means of the method.

According to an advantageous development of the method, the close proximity monitoring device generates sensor data reflecting the current position of the user, using which data a trajectory of the user is calculated to predict a continuation of the movement of the user. This allows different measures to be introduced in the motor vehicle before the user has actually reached the motor vehicle.

Using the trajectory, it is desirably estimated which point of access of the motor vehicle the user most likely intends to use, and precisely this point of access is released. Thus, only that point of access that the user is most likely to intend to use is released, with the remaining points of access of the motor vehicle are not being released, which is advantageous from a security perspective.

In a further preferred development of the method, the close proximity monitoring device comprises at least one ultrasound sensor, preferably several ultrasound sensors. Such ultrasound sensors are often already installed in motor vehicles for parking assistants, such that additional functionality is assigned to said already installed ultrasound sensors.

Alternatively, one or more vehicle cameras can be used for the close proximity monitoring device.

In a further alternative, both the outer zone and the inner zone can be monitored with one or more vehicle cameras.

In a further preferred embodiment of the method, it is provided that the first outer zone is surrounded by a second outer zone, wherein the first outer zone functions as an inner zone in relation to the second outer zone. The second outer zone is monitored by means of a second monitoring device of the motor vehicle, such that the current position of the user relative to the motor vehicle is determined by means of the second monitoring device if the user is located in the second outer zone. A monitoring radius, within which the current position of the user can be monitored by means of the method, can thus be increased. Of course, additional outer zones can additionally be attached to the second outer zone facing away from the motor vehicle in an analogous manner, which can further increase the monitoring radius.

The first and/or second monitoring device desirably comprises a receiver for wirelessly receiving a first and/or second communication signal that is emitted wirelessly from an identification transmitter of the user. Advantageously, the identification transmitter identifies the user as authorized to access the motor vehicle, such that it can be ensured that the at least one of several points of access is only released in the method if the user is also authorized for access.

The first communication signal is desirably based on the Bluetooth Low Energy standard. As an alternative or in addition, the second communication signal is based on the Ultra-Wide Band standard. Such common communication standards make the implementation of the method easier.

In a further advantageous development of the method, the current position of the user in the first and/or second outer zone is determined by means of a received field strength of the first and/or second communication signal. This allows a particularly precise and quick determination of the current position of the user.

According to a further preferred development of the method, a precision of the determination of the current position of the user in the inner zone is greater than in the first and/or second zone. The current position of the user can thus be determined even more precisely, the closer the user is located to the motor vehicle. This allows the method to be carried out particularly efficiently.

The invention additionally relates to a motor vehicle having a close proximity monitoring device for scanning an inner zone directly surrounding the motor vehicle. The motor vehicle additionally comprises a first monitoring device for monitoring an outer zone which adjoins the inner zone. The motor vehicle is equipped to carry out the method according to the invention, such that the advantages of the method according to the invention specified above also apply to the motor vehicle according to the invention.

Further important features and advantages of the invention result from the drawings and from the associated description of figures with reference to the drawings.

Naturally, the features specified above and the features still to be explained in the following can be used not only in the respectively specified combination, but also in other combinations or in isolation without leaving the scope of the present invention.

Preferred embodiments of the invention are depicted in the drawings and are explained in more detail in the following description of figures, wherein identical reference numerals relate to identical or functionally identical components.

BRIEF DESCRIPTION OF THE DRAWING FIGURES

Figure 2:
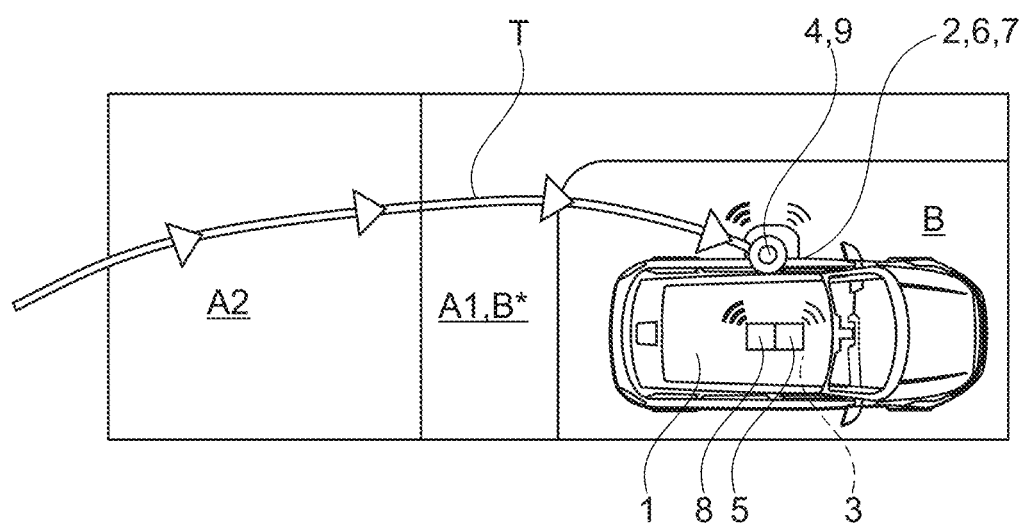

In the figures:

FIG. 1 shows, depicted from a bird's-eye perspective, an example of a motor vehicle according to the invention, equipped for a method according to the invention, and FIG. 2 shows the motor vehicle according to FIG. 1, also depicted in an aerial view from a bird's-eye perspective, during the implementation of an example of the method according to the invention.

DETAILED DESCRIPTION

In FIG. 1 illustrates an example of a motor vehicle 1 according to the invention from a bird's-eye perspective. The motor vehicle 1 comprises a close proximity monitoring device 6 for monitoring an inner zone B directly surrounding the motor vehicle 1. The motor vehicle 1 further comprises a first monitoring device 5 for monitoring an outer zone A1, which adjoins the inner zone B facing away from the motor vehicle 1. The motor vehicle 1 is equipped for the method according to the invention for releasing at least one of several points of access 2 to a vehicle interior 3 of the motor vehicle 1 for a user 4—not depicted in FIG. 1.

In FIG. 2, the example of FIG. 1 is also depicted in an aerial view from a bird's-eye perspective, and specifically while the method according to the invention is being carried out. The method according to the invention can thus be understood with reference to FIGS. 1 and 2. According to the method, the first outer zone A1, which adjoins the inner zone B directly surrounding the motor vehicle 1, is monitored by means of the first monitoring device 5 of the motor vehicle 1. The first outer zone A1 is monitored by means of the first monitoring device 5 such that a current position of the user 4 relative to the motor vehicle 1 is determined by means of the first monitoring device 5 if the monitoring shows that the user 4 is located in the first outer zone A1. According to the method, the close proximity monitoring device 6 of the motor vehicle 1 scanning the inner zone B is also activated if the monitoring shows that the user 4 is crossing from the first outer zone A1 into the inner zone B. Consequently, the current position of the user 4 relative to the motor vehicle 1 is only determined by means of the close proximity monitoring device 6 if the user 4 is located in the inner zone B. According to the invention, at least one of the points of access 2 to the vehicle interior 3 of the motor vehicle 1 is released for the user 4 after the monitoring has shown that they are located in the inner zone B.

It can be seen from FIG. 2 that the close proximity monitoring device B generates sensor data reflecting the current position of the user 4. Using this sensor data, a trajectory T of the user 4 is calculated to predict a continuation of the movement of the user 4. For this purpose, the previous movement of the user 4 tracked as a consequence of the monitoring can be used. Machine-learned patterns of behavior of the user 4 can optionally additionally be taken into account to predict the continuation of the movement of the user 4. By means of such a pattern of behavior, it can for example be taken into account which point of access 2 of the motor vehicle 1 the user 4 uses particularly frequently or in what order several of the points of access 2 of the motor vehicle 1 are used particularly frequently.

Using the trajectory T, it can be estimated according to the method which point of access 2 of the motor vehicle 1 the user 4 most likely intends to use. Precisely this point of access 2 is then released according to the method. The term "release" can be understood in this context to mean unlocking the vehicle door blocking the point of access 2 in question. Optionally, to release the point of access 2, the vehicle door blocking said point of access can be opened automatically.

According to FIGS. 1 and 2, the close proximity monitoring device 6 of the motor vehicle 1 comprises at least one ultrasound sensor 7. In the motor vehicle 1 of FIGS. 1 and 2, six such ultrasound sensors 7 are present, each of which can be assigned to one point of access 2 of the motor vehicle 2. Of course, the close proximity monitoring device 6 can comprise other sensors as an alternative or in addition, the sensors being based on a different operating principle. It is conceivable, for example, that the close proximity monitoring device 6 comprises at least one vehicle camera.

If there are one or more vehicle cameras, so-called Surround Vision Cameras (SVC) can be used. With SVC in the car (360 park cameras), gaze direction can be detected with a suitable detection program. Not only must the customer be located in the unlocking region of the motor vehicle, they must also be looking in the direction of the vehicle. The detection is possible via computer vision-based gaze direction detection. The customer does not need to trigger a handle to open/close a door. They must be in the corresponding region, look in the direction of the door or vehicle and wait for a short period of time (approx. 400 ms).

As can be understood with reference to FIG. 2, the first outer zone A1 is, for example, surrounded by a second outer zone A2. The first outer zone A1 functions as an inner zone B* in relation to the second outer zone A2. The second outer zone A2 is monitored by means of a second monitoring device 8 of the motor vehicle 1, such that the current position of the user 4 relative to the motor vehicle 1 is determined by means of the second monitoring device 8 if the user 4 is located in the second outer zone A2. The first monitoring device 5 can be activated if the monitoring by means of the second monitoring device 8 shows that the user 4 is crossing from the second outer zone A2 into the first inner zone A1, wherein the first inner zone A1 then functions as an inner zone B* in relation to the second outer zone A2. Consequently, the current position of the user 4 relative to the motor vehicle 1 is only determined by means of the first monitoring device 5 if the user 4 is located in the first outer zone A1 or the inner zone B* or the inner zone B.

FIGS. 1 and 2 additionally illustrate that the first and—as an alternative or in addition—second monitoring device 5, 8 comprises a receiver for wirelessly receiving a first or respectively second communication signal. This first or second communication signal is wirelessly emitted from an identification transmitter 9 of the user 4, see FIG. 2. The identification transmitter 9 can thus emit both the first and the second communication signal. The identification transmitter 9 can be an electronic radio key or a mobile electronic device, in particular a smartphone.

The first monitoring device 5 can receive the first communication signal. The second monitoring device 8 can receive the second communication signal. For example, the first communication signal is desirably based on the so-called "Bluetooth Low Energy standard. The second communication signal is, for example, based on the so-called Ultra-Wide Band standard. The current position of the user 4 is determined in the first and—as an alternative or in addition—second outer zone A1, A2 and optionally also in the inner zone B by means of a received field strength of the first or respectively second communication signal. For this purpose, a so-called RSSI level of the first or second communication signal can be used in a manner known per se. A precision of the determination of the current position of the user 4 in the inner zone B is greater than in the first or second outer zone A1, A2 in the method depicted in FIGS. 1 and 2.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for releasing at least one of several points of access to a vehicle interior of a motor vehicle for a user, the method comprising:
    monitoring, by a first monitoring device of the motor vehicle, a first outer zone surrounding an inner zone directly surrounding the motor vehicle such that a current position of the user relative to the motor vehicle is determined by the first monitoring device if the monitoring shows the user is located in the first outer zone;
    activating a close proximity monitoring device of the motor vehicle scanning the inner zone if the monitoring shows the user is crossing from the first outer zone into the inner zone such that the current position of the user relative to the motor vehicle is only determined by the close proximity monitoring device if the user is located in the inner zone; and
    releasing, after the monitoring shows that the user is in the inner zone, at least one of the points of access to the vehicle interior of the motor vehicle,
    wherein the first outer zone is surrounded by a second outer zone, wherein the first outer zone functions as an inner zone in relation to the second outer zone,
    wherein the second outer zone is monitored by a second monitoring device of the motor vehicle such that the current position of the user relative to the motor vehicle is determined by the second monitoring device if the user is located in the second outer zone,
    wherein the close proximity monitoring device, the first monitoring device, and the second monitoring device employ different modes of operation to monitor the inner zone, first outer zone, and second outer zone, respectively.

2. The method of claim 1, wherein the close proximity monitoring device generates sensor data reflecting the current position of the user, the method further comprising:
    calculating, using the generated sensor data, a trajectory of the user is to predict a continuation of the movement of the user.

3. The method of claim 2, further comprising:
    estimating, using the trajectory, which point of access of the motor vehicle the user most likely intends to use, and only the point of access of the motor vehicle the user most likely intends to use is released.

4. The method of claim 1, wherein the close proximity monitoring device comprises two or more ultrasound sensors or comprises one or more vehicle cameras.

5. The method of claim 1, wherein the first and second monitoring devices each comprise a receiver for wirelessly receiving a first or second communication signal wirelessly emitted from an identification transmitter of the user.

6. The method of claim 5, wherein
the first communication signal is based on the Bluetooth Low Energy standard; or
the second communication signal is based on the Ultra-Wide Band standard.

7. The method of claim 5, wherein the current position of the user in the first or second outer zone is determined by using a received field strength of the first or second communication signal.

8. The method of claim 5, wherein a precision of the determination of the current position of the user in the inner zone is greater than in the first or second outer zone.

9. A motor vehicle comprising:
a close proximity monitoring device configured to scan an inner zone directly surrounding the motor vehicle;
a first monitoring device configured to monitor an outer zone surrounding the inner zone; and
a second monitoring device configured to monitor a second outer zone surrounding the first outer zone,
wherein the first monitoring device is configured to monitor the outer zone such that a current position of the user relative to the motor vehicle is determined by the first monitoring device if the monitoring shows the user is located in the first outer zone,
wherein the close proximity monitoring device is configured to activate scanning the inner zone if the monitoring shows the user is crossing from the first outer zone into the inner zone such that the current position of the user relative to the motor vehicle is only determined by the close proximity monitoring device if the user is located in the inner zone,
wherein the second monitoring device is configured to monitor the current position of the user relative to the motor vehicle if the user is located in the second outer zone,
wherein after the monitoring shows that the user is in the inner zone, at least one of the points of access to the vehicle interior of the motor vehicle is configured to be released,
wherein the close proximity monitoring device, the first monitoring device, and the second monitoring device are configured to employ different modes of operation to monitor the inner zone, first outer zone, and second outer zone, respectively.

10. The motor vehicle of claim 9, wherein the close proximity monitoring device is configured to use ultrasound to monitor the inner zone, the first monitoring device is configured to use Bluetooth Low Energy Standard to monitor the first outer zone, and the second monitoring device is configured to use Ultra-Wide Band standard to monitor the second outer zone.

11. The motor vehicle of claim 9, wherein the close proximity monitoring device is further configured to use a camera to determine whether the user is looking at the vehicle before releasing the at least one of the points of access.

12. The method of claim 1, wherein the close proximity monitoring device is-uses ultrasound to monitor the inner zone, the first monitoring device uses Bluetooth Low Energy Standard to monitor the first outer zone, and the second monitoring device uses Ultra-Wide Band standard to monitor the second outer zone.

13. The method of claim 12, wherein the close proximity monitoring device uses a camera to determine whether the user is looking at the vehicle before releasing the at least one of the points of access.

* * * * *